United States Patent
Liao

(10) Patent No.: US 10,234,755 B2
(45) Date of Patent: Mar. 19, 2019

(54) PROJECTOR AND ILLUMINATION SYSTEM THEREOF

(71) Applicant: Coretronic Corporation, Hsin-Chu (TW)

(72) Inventor: Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/953,366

(22) Filed: Apr. 13, 2018

(65) Prior Publication Data

US 2018/0299758 A1    Oct. 18, 2018

(30) Foreign Application Priority Data

Apr. 14, 2017  (CN) .......................... 2017 1 0244118

(51) Int. Cl.
  *G03B 21/20*    (2006.01)

(52) U.S. Cl.
  CPC ....... *G03B 21/2066* (2013.01); *G03B 21/204* (2013.01); *G03B 21/208* (2013.01)

(58) Field of Classification Search
  CPC .. G03B 21/20; G03B 21/208; G03B 21/2013; G03B 21/2033; G03B 21/2053; G03B 21/2066; H04N 9/3111; H04N 9/3114; H04N 9/3161; H04N 9/3152; H04N 9/3164

See application file for complete search history.

(56) References Cited

U.S. PATENT DOCUMENTS

| | | | |
|---|---|---|---|
| 2013/0250255 A1* | 9/2013 | Kurosaki | F21V 13/08 353/85 |
| 2013/0322056 A1 | 12/2013 | Konuma et al. | |
| 2014/0071407 A1* | 3/2014 | Takahashi | G03B 21/142 353/31 |

FOREIGN PATENT DOCUMENTS

| | | |
|---|---|---|
| CN | 204593250 U | 8/2015 |
| CN | 103792768 B | 9/2015 |
| CN | 105278226 A | 1/2016 |
| CN | 105892210 A | 8/2016 |
| CN | 206610072 U | 11/2017 |
| JP | 2016170390 A | 9/2016 |
| TW | 201542966 A | 11/2015 |
| TW | 201544894 A | 12/2015 |
| TW | 201738648 A | 11/2017 |

\* cited by examiner

*Primary Examiner* — Sultan Chowdhury

(57) ABSTRACT

An illumination system includes an excitation light source, a lens group, a dichroic device and a phosphor wheel. The lens group has an optical axis and a light flux cross-section is perpendicular to the optical axis. The dichroic device includes a dichroic layer for reflecting the excitation beam to the lens group and projecting an overlapping region on the light flux cross-section in a direction of the optical axis. The optical axis does not pass through the overlapping region, and the overlapping region has an area ranged between the ¼ and ½ area of the light flux cross-section. The phosphor wheel receives the excitation beam and has a reflective region and a phosphor region. A projector including the illumination system is also provided.

27 Claims, 14 Drawing Sheets

PROJECTOR AND ILLUMINATION SYSTEM THEREOF

CROSS-REFERENCE TO RELATED APPLICATION

This application claims the priority benefit of China application (CN201710244118.2 filed on 2017 Apr. 14). The entirety of the above-mentioned patent application is hereby incorporated by reference herein and made a part of this specification.

FIELD OF THE INVENTION

The invention relates to a display device, and more particularly to a projector and an illumination system thereof.

BACKGROUND OF THE INVENTION

A conventional digital light processing (DLP) projector includes an illumination system, a digital micro-mirror device (DMD) and a projection lens. The illumination system is used to provide an illumination beam, the digital micro-mirror device is used to convert the illumination beam into an image beam, and the projection lens is used to project the image beam onto a screen to form an image screen on the screen. In addition, with the development of illumination technology, most of the conventional projectors have employed a laser source as the light source of the illumination system, wherein the laser source may be laser diode LD).

FIG. 1 is a schematic view of a conventional illumination system employing a laser source. Referring FIG. 1. In the illumination system 100, the laser source module 110 can emit a blue beam 112. The blue beam 112 is irradiated to the phosphor wheel 140 after sequentially passing through the collimating element 122, the dichroic mirror 130 and the lenses 123, 124. The phosphor wheel 140 rotates and may have a reflective portion, a green phosphor region, a yellow phosphor region and a transmissive region or an opening region (these elements of the phosphor wheel 140 are not shown), and the green phosphor region and the yellow phosphor region both are formed on the reflective portion.

When the blue beam 112 is individually irradiated in the green phosphor region and the yellow phosphor region, the green phosphor region and the yellow phosphor region respectively excite the green beam 113 and the yellow beam 114, and the reflective portion reflects the green beam 113 and the yellow beam 114 to the dichroic mirror 130. The green beam 113 and the light beam 114 reflected by the dichroic mirror 130 are irradiated to the rotatable color wheel 150 after passing through the lens 125. The opening region of the phosphor wheel 140 may allow the blue beam 112 to penetrate. After the blue beam 112 penetrating the opening region, the blue beam 112 sequentially passes through the lenses 126, 127, the reflective portions 161, 162, the lens 128, the reflective portion 163, the lens 129, the dichroic mirror 130 and the lens 150. Thereafter, the blue beam 112 is irradiated to the color wheel 150.

The color wheel 150 has a red light filter region, a green light filter region, a transparent region and a diffusion region. The yellow phosphor region corresponds to the red light filter region and the transparent region, the green phosphor region corresponds to the green light filter region, and the opening region corresponds to the diffusion region. The color wheel 150 and the phosphor wheel 140 can be rotated in cooperation with each other, so that the green beam 113 is irradiated to the green light filter region, the yellow beam 114 is irradiated to the red light filter region and the transparent region, and the blue beam 112 is irradiated to the diffusion region. The color beam filtered by the color wheel 150 is a blue, a green beam and a red beam for forming a color image and a yellow beam for increasing the luminance. The color beams then enter the optical integration rod 170.

However, according to the above description, it is understood that the conventional illumination system 100 requires many optical elements (e.g., a plurality of lenses 123 to 128) and has a complicated optical layout. Therefore, the conventional illumination system 100 has some disadvantages such as high cost, large volume and poor optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illumination system employing fewer optical elements and a simplified optical layout to help to reduce cost and volume.

The invention further provides a projector including the aforementioned illumination system.

Other objectives and advantages of the invention become apparent from the technical features disclosed in the invention.

The invention provides an illumination system, which includes an excitation light source, a lens group, a dichroic device and a phosphor wheel. The excitation light source is adapted for emitting an excitation beam. The lens group has an optical axis and a light flux cross-section perpendicular to the optical axis. The dichroic device includes a dichroic layer. The dichroic layer is adapted for reflecting the excitation beam to the lens group and projecting an overlapping region on the light flux cross-section in a direction parallel to the optical axis. The optical axis does not pass through the overlapping region, and an area of the overlapping region is larger than a ¼ area of the light flux cross-section and smaller than a ½ area of the light flux cross-section. The phosphor wheel is adapted for receiving the excitation beam passing through the lens group and has a reflective region and at least one phosphor region. The at least one phosphor region is adapted for converting the excitation beam into a conversion beam and reflecting the conversion beam to the lens group. The reflective region is adapted for reflecting the excitation beam back to the lens group. The excitation beam and the conversion beam both pass through the light flux cross-section, and the conversion beam penetrates the dichroic layer.

The invention further provides a projector including the aforementioned illumination system, a light valve unit and a projection lens. The light valve unit is disposed on the transmission path of the illumination beam converted by a light integration rod and is adapted for converting the illumination beam into an image beam. The projection lens is disposed on the transmission path of the image beam.

In summary, by the disposing means between the aforementioned dichroic layer and the lens group, the overlapping area projected by the dichroic layer on the light flux cross-section is not passed through by the optical axis of the lens group and the area of the overlapping region is larger than the ¼ area of the light flux cross-section and smaller than the ½ area of the light flux cross-section. Thus, the optical axis of the lens group does not pass through the dichroic layer and the axis of the excitation beam is noncoaxial with the optical axis of the lens group, so that the lens group can deflect the excitation beam and the excitation beam emitted from the phosphor wheel is not all blocked by the dichroic layer, or even completely not blocked by the dichroic layer. Compared with the conventional illumination systems, the invention apparently employs fewer optical elements and has a simpler optical layout, thereby helping to reduce cost and volume.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
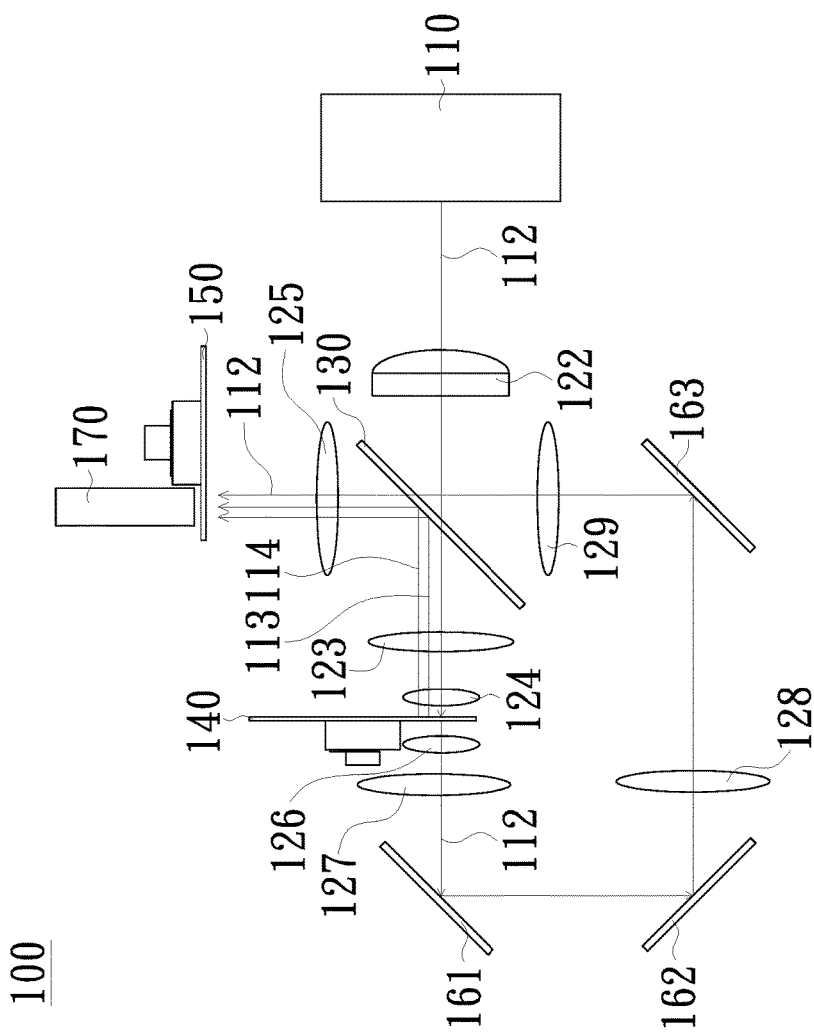
FIG. 1 is a schematic view of a conventional illumination system employing a laser source.
Figure 2A:
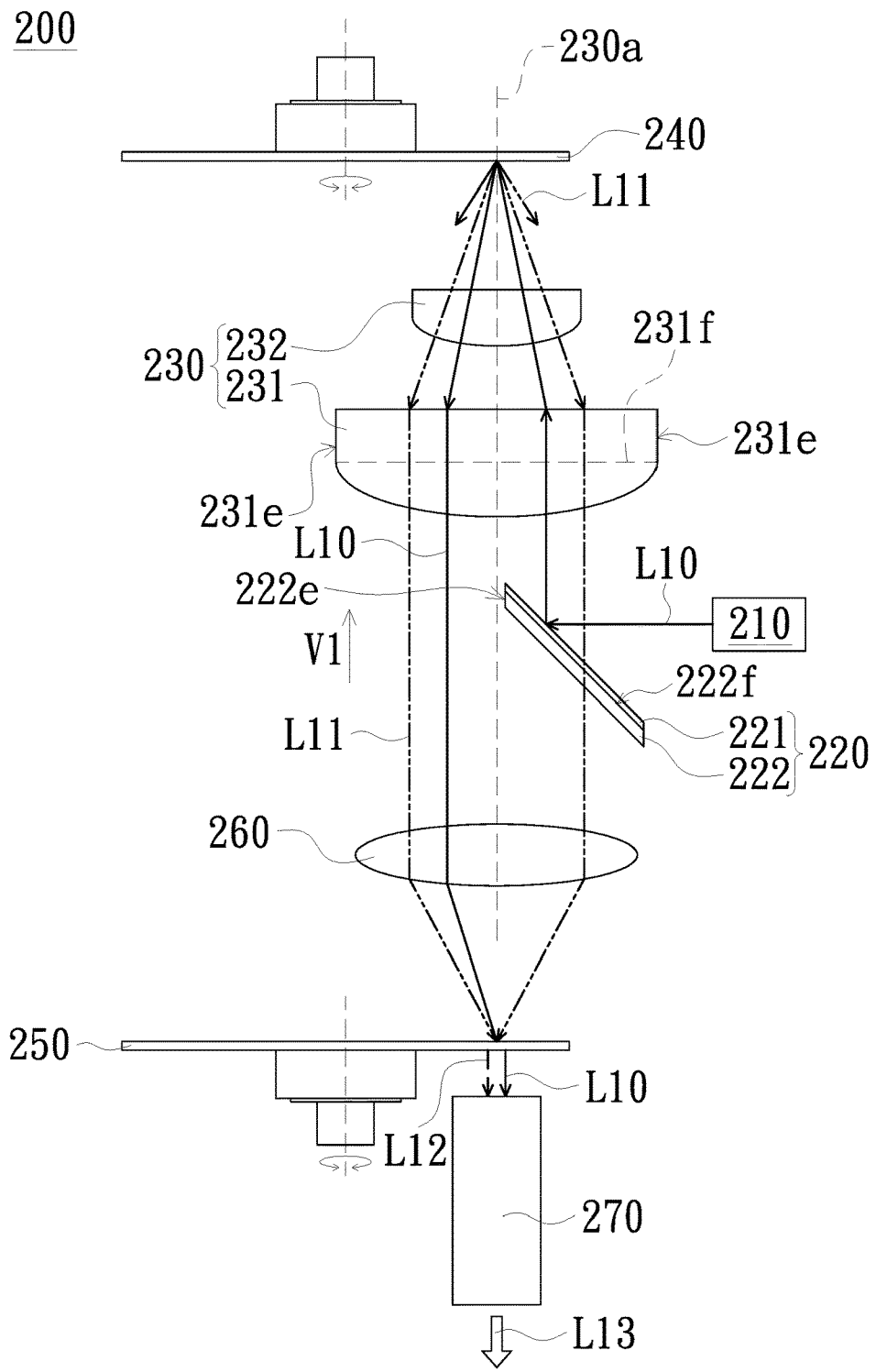
FIG. 2A is a schematic view of an illumination system in accordance with an embodiment of the invention.

FIG. 2A is a schematic view of an illumination system in accordance with an embodiment of the invention. Referring to FIG. 2A. The illumination system 200 includes an excitation light source 210, a dichroic device 220 and a lens group 230. The excitation light source 210 can emit an excitation beam L10 and may be a laser light source such as a laser diode and therefore the excitation beam L10 may be a laser beam, or may be a light emitting diode (LED) light source. In addition, the excitation beam L10 may be a blue beam having a wavelength of 445 nm or 455 nm for example. The dichroic device 220 includes a dichroic layer 221 and a transparent substrate 222. The transparent substrate 222 is, for example, a glass plate or an acrylic plate. The transparent substrate 222 has a plane 222f, and the dichroic layer 221 is formed on the plane 222f and covers the plane 222f.

The dichroic layer 221 can reflect a beam of a specific wavelength range and allow a beam of a wavelength range other than the specific wavelength range to penetrate. For example, the dichroic layer 221 is disposed on the transmission path of the excitation beam L10 and can reflect the excitation beam L10 to the lens group 230. In addition, the dichroic layer 221 is, for example, a dichroic mirror or an interference filter film and has an optical multilayer structure.

The lens group 230 is also disposed on the transmission path of the excitation beam L10 and may include at least one lens. Taking the embodiment of FIG. 2A as an example. The lens group 230 includes two lenses 231 and 232. However, in other embodiments, the lens group 230 may include only one lens or three or more lenses. Therefore, the number of lenses included in the lens group 230 is not limited to two as shown in FIG. 2A. In the embodiment of FIG. 2A, the excitation beam L10 sequentially pass through the lens 231 and the lens 232. The lens 231 and the lens 232 overlap each other, and the size of the lens 231 is larger than the size of the lens 232. The lens 232 does not protrude the edge 231e of the lens 231, that is, the lens 232 does not cover the edge 231e of the lens 231, thereby controlling the light divergence angle of the excitation beam L10.

The lens group 230 has an optical axis 230a. The optical axis 230a penetrates the lenses 231 and 232 along the axis of the lenses 231 and 232, so that the lenses 231 and 232 are coaxial with each other. In addition, the transparent substrate 222 may have a beveled edge 222e that may be parallel to the optical axis 230a. The lens group 230 further has a light flux cross-section 231f. The optical axis 230a is perpendicular to the light flux cross-section 231f and passes through the light flux cross-section 231f, wherein the optical axis 230a passes through the center position of the light flux cross-section 231f.

The excitation beam L10 also passes through the light flux cross-section 231f, but the axis of the excitation beam L10 does not overlap the optical axis 230a. The axis of the excitation beam L10 refers to the axis of the main ray of the excitation beam L10. Therefore, the axis of the excitation beam L10 is noncoaxial with the optical axis 230a of the lens group 230, so that the lens group 230 can deflect the traveling direction of the excitation beam L10, as shown in FIG. 2A. In addition, the drawings of the invention illustrate the main ray of the excitation beam L10 as a straight line, and the straight line can be regarded as the axis of the excitation beam L10. Therefore, as shown in FIG. 2A, it is apparent that the axis of the excitation beam L10 is noncoaxial with the optical axis 230a of the lens group 230, so that the excitation beam L10 can be deflected by the lens group 230, as shown in FIG. 2A.

Figure 2B:
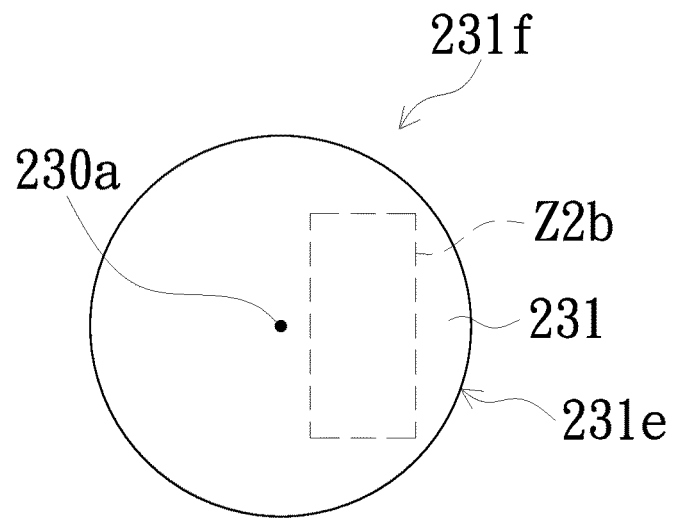
FIG. 2B is a schematic view of an overlapping region between the dichroic layer and the light flux cross-section in FIG. 2A.

Referring to FIGS. 2A and 2B. FIG. 2B is a schematic side view of the lens group 230 taken along the direction V1 in FIG. 2A, wherein the direction V1 is parallel to the optical axis 230a. Since the size of the lens 231 is larger than the size of the lens 232 and the lens 231 and the lens 232 are coaxial with each other, it is observed that the lens 231 completely covers the lens 232 while viewing the lens group 230 in the direction V1, so that only the lens 231 is shown in FIG. 2B. The light flux cross-section 231f is an imaginary plane of the lens group 230, and the contour of the light flux cross-section 231f is equivalent to the edge of the lens having the effective and largest size in the lens group 230. Taking FIG. 2B as an example, the contour of the light flux cross-section 231f is equivalent to the edge 231e of the lens 231. That is, the region surrounded by the edge 231e is equivalent to the light flux cross-section 231f in FIG. 2B.

The dichroic device 220, the lens 231 and the lens 232 all are arranged along the optical axis 230a, and the dichroic device 220 overlaps the lens group 230. Specifically, the dichroic layer 221 projects the overlapping region Z2b on the light flux cross-section 231f in the direction parallel to the optical axis 230a, as shown in FIG. 2B. As shown in FIG. 2B, the area of the overlapping area Z2b having a rectangular shape is clearly larger than the ¼ area of the light flux cross-section 231f (i.e., the region surrounded by the edge 231e) and smaller than the ½ area of the light flux cross-section 231f. In addition, the optical axis 230a does not pass through the overlapping region Z2b, that is, the optical axis 230a does not pass through the dichroic layer 220.

Figure 2C:
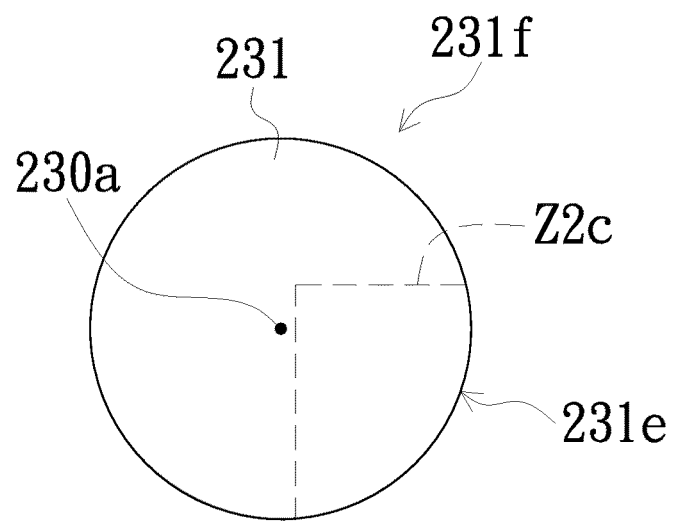
FIG. 2C is a schematic view of another overlapping region between the dichroic layer and the light flux cross-section in FIG. 2A.

FIG. 2C is a schematic view of another overlapping region between the dichroic layer and the light flux cross-section in FIG. 2A. Referring to FIGS. 2A and 2C. In addition to the overlapping region Z2b shown in FIG. 2B, the dichroic layer 221 may also project the overlapping region Z2c on the light flux cross-section 231f in the direction parallel to the optical axis 230a, as shown in FIG. 2C. Unlike the overlapping region Z2b having a rectangular shape in FIG. 2B, the overlapping region Z2c in FIG. 2C has a fan shape. In addition, as shown in FIG. 2C, the area of the overlapping region Z2c is also clearly larger than the ¼ area of the light flux cross-section 231f and smaller than the ½ area of the light flux cross-section 231f, and the optical axis 230a does not pass through the overlapping region Z2c. Therefore, it can be seen that the overlapping region projected on the light flux cross-section 231f by the dichroic layer 221 may have various shapes, for example, a rectangular overlapping region Z2b or a fan-shaped overlapping region Z2c.

Referring to FIG. 2A. The illumination system 200 further includes a phosphor wheel 240 disposed on the transmission path of the excitation beam L10. The lens group 230 is disposed between the dichroic device 220 and the phosphor wheel 240, so that the phosphor wheel 240 can receive the excitation beam L10 passing through the lens group 230. The phosphor wheel 240 can be rotated relative to the dichroic device 220, so that the excitation beam L10 can be irradiated to a plurality of different sections of the phosphor wheel 240. At least one section of the phosphor wheel 240 can convert the excitation beam L10 into at least one conversion beam L11 and reflect the conversion beam L11 to the lens group 230, and another section of the phosphor wheel 240 can directly reflect the excitation beam L10 back to the lens group 230, so that the excitation beam L10 and the conversion beam L11 both pass through the light flux cross-section 231f. The conversion beam L11 can penetrate the dichroic device 220, that is, the conversion beam L11 penetrates the dichroic layer 221.

Figure 2D:
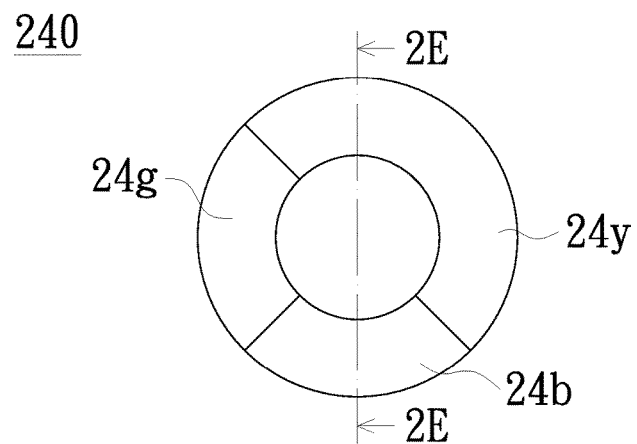
FIG. 2D is a front view of the phosphor wheel in FIG. 2A.

FIG. 2D is a front view of the phosphor wheel in FIG. 2A. Referring to FIGS. 2A and 2D. The phosphor wheel 240 has a reflective region 24b, and the reflective region 24b can reflect the excitation beam L10 back to the lens group 230. In addition, the phosphor wheel 240 further has at least one phosphor region. Taking the embodiment of FIG. 2D as an example. The phosphor wheel 240 has two phosphor regions 24y and 24g, wherein the phosphor regions 24y and 24g can convert the excitation beam L10 into two conversion beams L11 having different wavelengths and reflect the conversion beams L11 to the lens group 230, respectively.

For example, the conversion beam L11 converted by the phosphor region 24y may be a yellow light and the conversion beam L11 converted by the phosphor region 24g may be a green light. Therefore, the conversion beams L11 generated by the phosphor regions 24y and 24g have different wavelengths, so that the phosphor wheel 240 can provide a green light and a yellow light. In addition, these conversion beams L11 (e.g., yellow light and green light) all penetrate the dichroic device 220 and its dichroic layer 221. Although the phosphor wheel 240 has two phosphor regions 24y and 24g in the embodiment of FIG. 2D, the phosphor wheel 240 may have only one phosphor region 24y in other embodiments, so that the number of phosphor regions that the phosphor wheel 240 has may be one and is not limited to be plural.

Figure 2E:
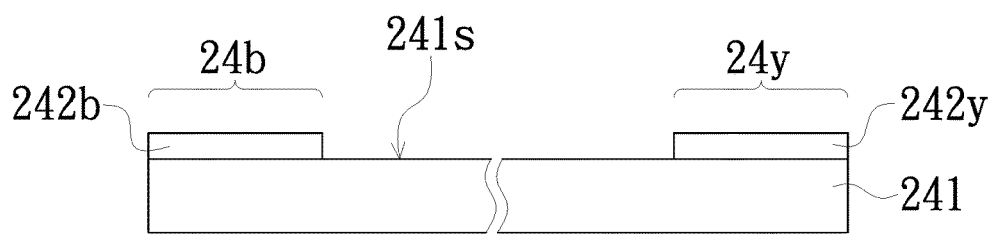
FIG. 2E is a schematic cross-sectional view of a phosphor wheel taken along the line 2E-2E in FIG. 2D.

FIG. 2E is a schematic cross-sectional view of a phosphor wheel taken along the line 2E-2E in FIG. 2D. Referring to FIGS. 2D and 2E. The phosphor wheel 240 includes a turntable 241 and at least one phosphor material. The turntable 241 may be a metal plate or a substrate coated with a reflective layer, wherein the reflective layer is a metal film (not shown) and the substrate is a glass plate or a ceramic plate for example. The turntable 241 has a light receiving surface 241s which can reflect rays, and the aforementioned phosphor material is disposed on the light receiving surface 241s.

In the embodiment shown in FIGS. 2D and 2E, the light receiving surface 241s is divided into the reflective region 24b and the phosphor regions 24y and 24g. The phosphor wheel 240 includes two different phosphor materials, for example, phosphor powder. Among the two phosphor materials, one of the phosphor materials is a phosphor material 242y which is disposed in the phosphor region 24y and may be a yellow phosphor. Another phosphor material (not shown) is disposed in the phosphor region 24g and may be a green phosphor. Thus, the two phosphor materials can respectively convert the excitation beam L10 into different conversion beams L11, such as the yellow and green light conversion beams L11. The light receiving surfaces 241s under these phosphor materials can reflect these conversion beams L11, so that these conversion beams L11 are incident on the lens group 230.

When the aforementioned phosphor material (including the phosphor material 242y) is a phosphor powder, the conversion beams L11 emitted from the phosphor regions 24y and 24g both are scattered lights and may have a Lambertian distribution. That is, these conversion beams L11, which have just been emitted from the phosphor regions 24y and 24g, are divergent beams. The lens group 230 can collect these divergent conversion beams L11 and concentrate, collimate and emit out these conversion beams L11 to reduce the loss of the conversion beams L11.

The phosphor wheel 240 further includes a light diffusion film 242b for scattering rays. The light diffusion film 242b is formed on the light receiving surface 241s and located in the reflective region 24b. The light diffusion film 242b can scatter a portion of the excitation beam L10 when the excitation beam L10 is incident on the light diffusion film 242b. Since the excitation beam L10 is a laser beam, the excitation beam L10 has coherence and so that the excitation beam L10 incident on a smooth surface tends to generate speckles due to interference, thereby resulting in a reduced image quality. The scattering of the excitation beam L10 by the light diffusion film 242b can reduce or destroy the effect of the coherence, thereby reducing or eliminating the generation of the speckles. However, in the embodiment, the light diffusion film 242b may scatter only a small portion of the excitation beam L10. That is, to maintain a certain optical efficiency, the excitation beam L10 emitted from the light diffusion film 242b may not have a Lambertian distribution.

Referring to FIGS. 2A and 2D. When the excitation light beam L10 is reflected back to the lens group 230 by the reflective region 24b, since the excitation light beam L10 has been deflected by the lens group 230 before being incident on the reflective region 24b, the axis of the excitation beam L10 reflected back to the lens group 230 does not pass through the dichroic layer 221, that is, the excitation beam L10 is not directly incident on the dichroic layer 221. Thus, the dichroic layer 221 does not block the excitation beam L10 transmitted by the lens group 230. Therefore, the excitation beam L10 emitted from the phosphor wheel 240 is not completely blocked by the dichroic layer 221, so that the excitation beam L10 and the conversion beam L11 can be received by the subsequent optical element and converted into the illumination beam L13. In addition, since the beveled edge 222e of the transparent substrate 222 is parallel to the optical axis 230a, the excitation light beam L10 emitted from the phosphor wheel 240 is prevented from being incident to the rays in the transparent substrate 222, thereby increasing the optical efficiency.

Referring to FIG. 2A. The illumination system 200 may further include a light receiving member 260 and a filter wheel 250, wherein the light receiving member 260 and the filter wheel 250 are sequentially disposed on the transmission path of the excitation beam L10 and the conversion beam L11. The dichroic device 220 is disposed between the light receiving member 260 and the lens group 230, the lens group 230 and the light receiving member 260 both are disposed between the filter wheel 250 and the phosphor wheel 240, so that the excitation light beam L10 and the conversion light beam L11 emitted from the phosphor wheel 240 sequentially pass through the light receiving member 260 and the filter wheel 250 after passing through the lens group 230.

The light receiving member 260 can converge the excitation beam L10 and the conversion beam L11, wherein the light receiving member 260 is a convex lens for example, but is not limited thereto. The filter wheel 250 can be rotated relative to the dichroic device 220, so that the excitation beam L10 and the conversion beam L11 can be irradiated to different sections of the filter wheel 250. The filter wheel 250 can filter the conversion beam L11 to form a plurality of filter beams L12 (only one filter beam is shown in the drawing), and the filter wheel 250 may further allow the excitation beam L10 to penetrate. In addition, in the embodiment, the color of the excitation beam L10 after penetrating the filter wheel 250 does not change, but is not limited thereto.

Figure 2F:
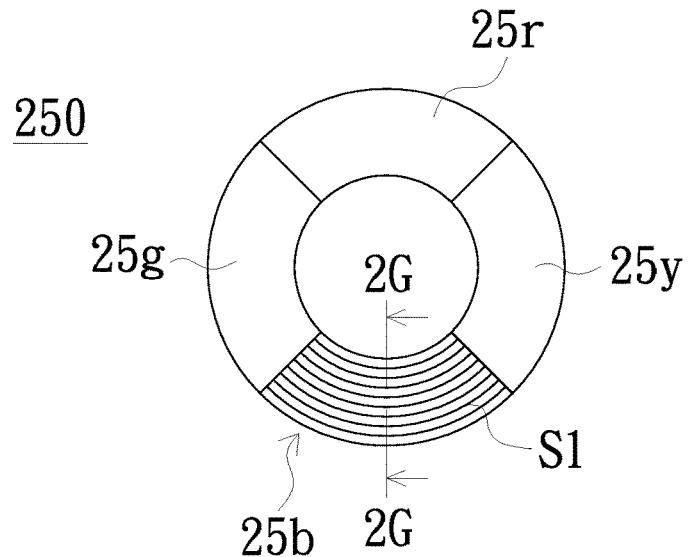
FIG. 2F is a schematic front view of the filter wheel in FIG. 2A.

FIG. 2F is a front view of the filter wheel in FIG. 2A. Referring to FIGS. 2A and 2F. The filter wheel 250 may have a plurality of light penetrating portions 25b and 25y and a plurality of filter portions 25r and 25g. The light penetrating portion 25b is used to allow the excitation beam L10 to penetrate, and the light penetrating portion 25y is used to allow a portion of the conversion beam L11 to penetrate. The filter portions 25r and 25g can filter the other portion of the conversion beam L11 to form these filter beams L12, wherein these filter beams L12 may be a primary color light or a beam having a color close to a primary color, but is not limited thereto.

Specifically, these conversion beams L11 incident on the filter wheel 250 may be a yellow light and a green light, respectively. The yellow conversion beam L11 penetrates the filter portion 25r and the light penetrating portion 25y, wherein the color of the yellow conversion beam L11 after penetrating the light penetrating portion 25y does not change. Since a yellow light can be formed by mixing a red light and a green light, a yellow light contains a red light and a green light. Therefore, the yellow conversion beam L11 after penetrating the filter portion 25r is converted into the red filter beam L12. The green conversion beam L11 penetrates the filter portion 25g and is converted into the green filter beam L12 by the filter portion 25g, wherein the green filter light beam L12 may be a green primary color light or a beam having a color closer to a green primary light than the green conversion beam L11 has. In addition, since a yellow light contains a red light and a green light, the green filter beam L12 may be formed by filtering the yellow conversion beam L11 by the filter portion 25g in another embodiment, and the phosphor wheel 240 may include only one yellow phosphor material, such as the phosphor material 242y.

Figure 2G:
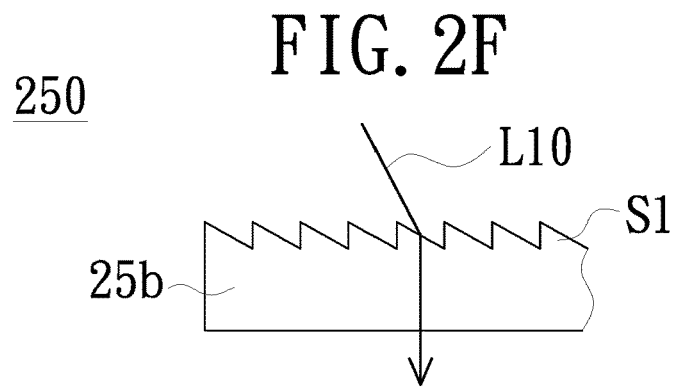
FIG. 2G is a schematic cross-sectional view of the filter wheel taken along the line 2G-2G in FIG. 2F.

FIG. 2G is a schematic cross-sectional view of a filter wheel taken along the line 2G-2G in FIG. 2F. Referring to FIGS. 2F and 2G. In the embodiment, the light penetrating portion 25b may have a surface scattering structure S1 for scattering the excitation beam L10, so that the excitation beam L10 can be uniformly emitted from the filter wheel 250 and the speckle generated by the interference can be effectively reduced or eliminated. As shown in FIG. 2G, the surface scattering structure S1 has a serrated structure and the surface scattering structure S1 has a plurality of protrusions (not shown), wherein the shapes of these protrusions are substantially the same. These protrusions are substantially identical in width and have a width of 1 μm or more, so that the surface scattering structure S1 is difficult to generate a visible light diffraction.

In the embodiment of FIG. 2G, these protrusions are arranged in a regular manner and the surface scattering structure S1 may be the same as the surface prism rod structure of the prism sheet, so that the light penetrating portion 25b can deflect the excitation beam L10, as shown in FIG. 2G. However, these protrusions of the surface scattering structure S1 may be arranged in an irregular manner in other embodiments, wherein at least two of the protrusions may be different from each other in size (e.g., width) or shape. In addition, the protrusions of the surface scattering structure S1 may be replaced with recesses having the same size and shape. Alternatively, the protrusion of the surface scattering structure S1 may also be replaced with recesses arranged in an irregular manner, wherein at least two of the recesses are different from each other in size or shape.

Referring to FIG. 2A. The illumination system 200 further includes a light integration rod 270 located on the transmission path of the filter beam L12 and the excitation beam L10. The filter wheel 250 is located between the light integration rod 270 and the dichroic device 220, so that the light integration rod 270 can receive and concentrate the filter beam L12 and the excitation beam L10 from the filter wheel 250 and convert the filter beam L12 and the excitation beam L10 into the illumination beam L13. The illumination beam L13 may be applied to the projector and may be incident on the light valve unit and the projection lens so as to be converted into an image beam capable of forming an image screen on the screen.

Figure 3:
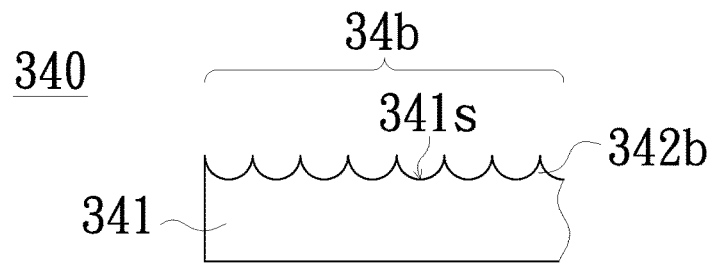
FIG. 3A is a schematic cross-sectional view of a phosphor wheel in accordance with another embodiment of the invention.

FIG. 3 is a schematic cross-sectional view of a phosphor wheel in accordance with another embodiment of the invention. Referring to FIG. 3. The phosphor wheel 340 of FIG. 3A is similar to the phosphor wheel 240 of FIG. 2E. The phosphor wheel 340 also has a reflective region 34b and at least one phosphor region (not shown) and includes a turntable 341 and a phosphor material (not shown). Since the phosphor rotors 340 and 240 are similar, the same structural features of the two will not be described herein, and FIG. 3 only illustrates the difference between the two, that is, the reflective region 34b of the phosphor wheel 340.

Specifically, the turntable 341 has an optical microstructure 342b. The optical microstructure 342b is formed on the light receiving surface 341s and located in the reflective region 34b. The optical microstructure 342b can scatter the excitation beam L10, and the optical microstructure 342b may be a plurality of recesses (not shown) formed on the light receiving surface 341s, as shown in FIG. 3. The size of the recess of the optical microstructure 342b may be identical with the size of the protrusion of the surface scattering structure S1 in FIG. 2G, so that the optical microstructure 342b is also difficult to generate a visible light diffraction.

In the embodiment of FIG. 3, the shapes of these recesses of the optical microstructure 342b may be substantially the same, and these recesses may have substantially the same width and may be arranged in a regular manner. However, these recesses may be arranged in an irregular manner in the optical microstructure 342b of other embodiments, wherein at least two of the recesses may be different from each other in size or shape. In addition, the optical microstructure 342b may be a plurality of protrusions formed on the light receiving surface 341s, and the structure thereof is the same as the surface scattering structure S1 of FIG. 2G.

Figure 4A:
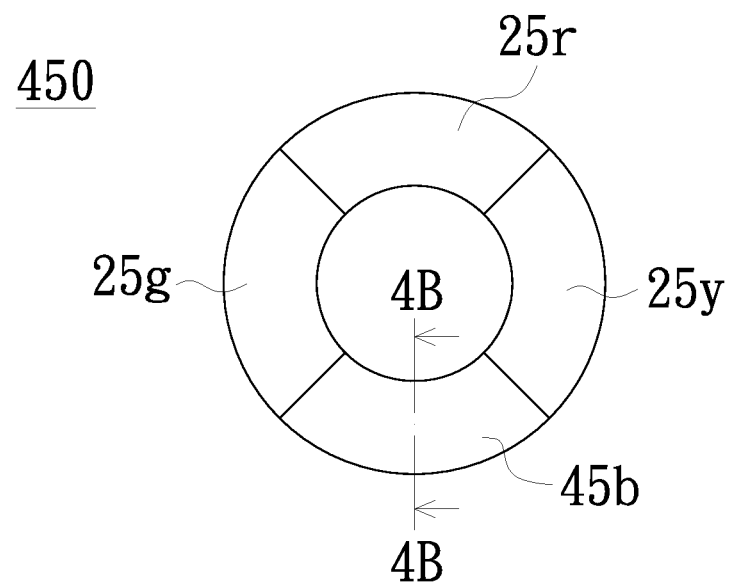
FIG. 4A is a schematic front view of a filter wheel in accordance with another embodiment of the invention.
Figure 4B:
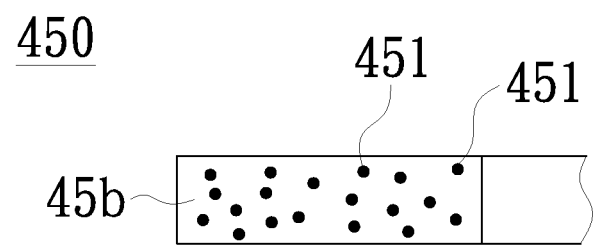
FIG. 4B is a schematic cross-sectional view of the filter wheel taken along the line 4B-4B in FIG. 4A.

FIG. 4A is a schematic front view of a filter wheel in accordance with another embodiment of the invention, and FIG. 4B is a schematic cross-sectional view of a filter wheel taken along the line 4B-4B of FIG. 4A. Referring to FIGS. 4A and 4B. The filter wheel 450 of FIG. 4A is similar to the filter wheel 250 of FIG. 2F. For example, the filter wheel 450 also has a plurality of light penetrating portions 45b and 25y and a plurality of filter portions 25r and 25g. However, unlike the filter wheel 250, the light penetrating portion 45b of the filter wheel 450 has a plurality of light scattering particles 451. The effect of these light scattering particles 451 is similar to the surface scattering structure S1 in FIG. 2G, that is, these light scattering particles 451 are used to scatter the excitation beam L10. It can be seen that the filter wheel disclosed in the plurality of embodiments of the invention may use the surface scattering structure S1 or the plurality of scattering particles 451 to realize the scattering of the excitation beam L10, such as the aforementioned filter wheels 450 and 250.

Figure 5A:
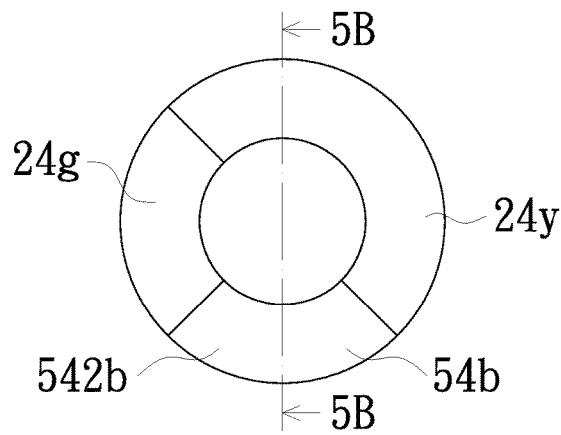
FIG. 5A is a schematic front view of a phosphor wheel in accordance with another embodiment of the invention.
Figure 5B:
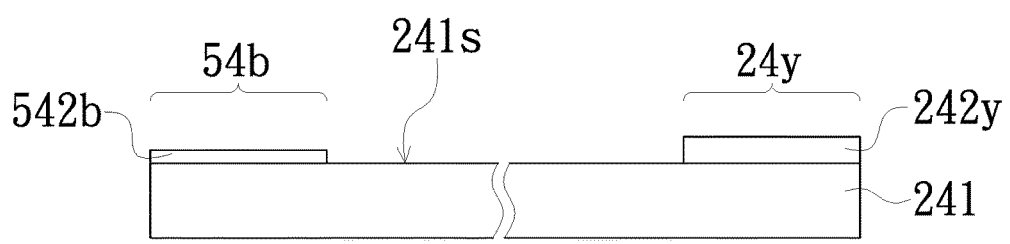
FIG. 5B is a schematic cross-sectional view of the phosphor wheel taken along the line 5B-5B in FIG. 5A.

FIG. 5A is a schematic top view of a phosphor wheel in accordance with another embodiment of the invention, and FIG. 5B is a schematic cross-sectional view of a phosphor wheel taken along the line 5B-5B in FIG. 5A. Referring to FIGS. 5A and 5B. The phosphor wheel 540 of FIGS. 5A and 5B is similar to the phosphor wheel 240 of FIG. 2D. For example, the phosphor wheel 540 also has a reflective region 54b and two phosphor regions 24y and 24g and includes a turntable 241 and a phosphor material 242y. However, unlike the phosphor wheel 240, the phosphor wheel 540 further includes an auxiliary phosphor material 542b, which is disposed in the reflective region 54b and capable of converting the excitation beam L10 into an auxiliary color light (not shown).

Taking FIG. 5B as an example. The auxiliary phosphor material 542b may be a phosphor powder and completely cover the reflective region 54b. As shown in FIG. 5B, the thickness of the auxiliary phosphor material 542b is smaller than the thickness of the phosphor material 242y, and the auxiliary phosphor material 542b may be a thin layer of the phosphor power, so that the auxiliary phosphor material 542b can only convert a portion of the excitation beam L10 into the auxiliary color light and does not convert all or most of the excitation beam L10 into the auxiliary color light. In addition, the auxiliary phosphor material 542b and the phosphor material in the phosphor region 24g may be the same phosphor material, that is, the auxiliary color light and the conversion beam L11 emitted from the phosphor region 24g have the same color.

In the embodiment, the conversion beam L11 emitted from the phosphor region 24g may be a green light, and the auxiliary color light may be a green light too. The excitation beam L10 may be a blue light having a wavelength of 445 nm or 455 nm, and this blue light is actually a purplish blue light. However, since the auxiliary phosphor material 542b converts a portion of the excitation beam L10 into the auxiliary color light (green light), the excitation beam L10 and the auxiliary color light can be mixed with each other to form a beam having a color close to a blue primary color, and even form a blue primary color light, thereby increasing the image color.

Figure 6:
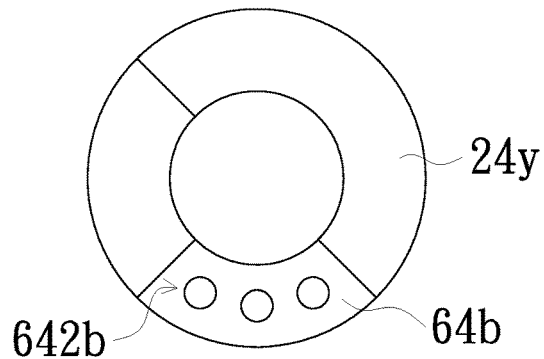
FIG. 6 is a schematic front view of a phosphor wheel in accordance with another embodiment of the invention.

FIG. 6 is a schematic view of a phosphor wheel 640 in accordance with another embodiment. The phosphor wheel 640 is similar to the phosphor wheel 540 of FIG. 5A and also has a reflective region 64b. The phosphor wheel 640 and the phosphor wheel 540 have the same function and can convert a portion of the excitation beam L10 into an auxiliary color light. However, unlike the phosphor wheel 540, although the phosphor wheel 640 also includes an auxiliary phosphor material 642b disposed in the reflective region 64b, the auxiliary phosphor material 642b partially covers the reflective region 64b, that is, the auxiliary phosphor material 642b does not completely cover the reflective region 64b. Taking FIG. 6 as an example, the auxiliary phosphor material 642b is distributed in the reflective region 64b in dotted form. Of course, the auxiliary phosphor material 642b may also be formed in the reflective region 64b in other distributions, such as a fringe distribution or a grid distribution. Therefore, the auxiliary phosphor material 642b is not limited to a dotted distribution.

The thickness of the auxiliary phosphor material 642b may be the same as the thickness of the phosphor material 242y (not shown in FIG. 6) in the phosphor region 24y, that is, the thickness of the auxiliary phosphor material 642b of FIG. 6 may be greater than the thickness of the auxiliary phosphor material 542b of FIG. 5B. In addition, it is to be noted that the auxiliary phosphor materials 542b and 642b shown in FIGS. 5A, 5B and 6 may also be used for the phosphor wheels 240 and 340 of FIGS. 2D and 3. That is, the auxiliary phosphor material 542b or 642b may be formed in the reflective region 24b of the phosphor wheel 240 or formed in the reflective region 34b of the phosphor wheel 340.

Figure 7A:
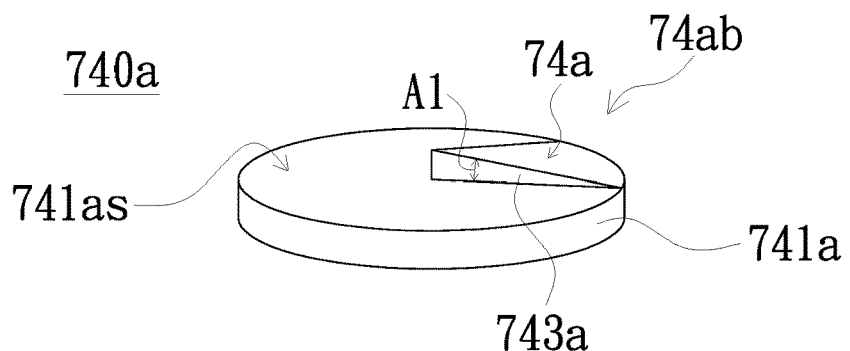
FIGS. 7A to 7C are schematic perspective views of a phosphor wheel in accordance with the other three embodiments of the invention.
Figure 7B:
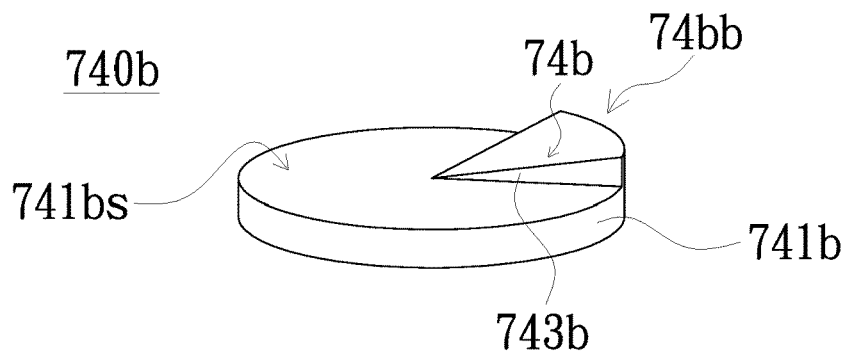
Figure 7C:
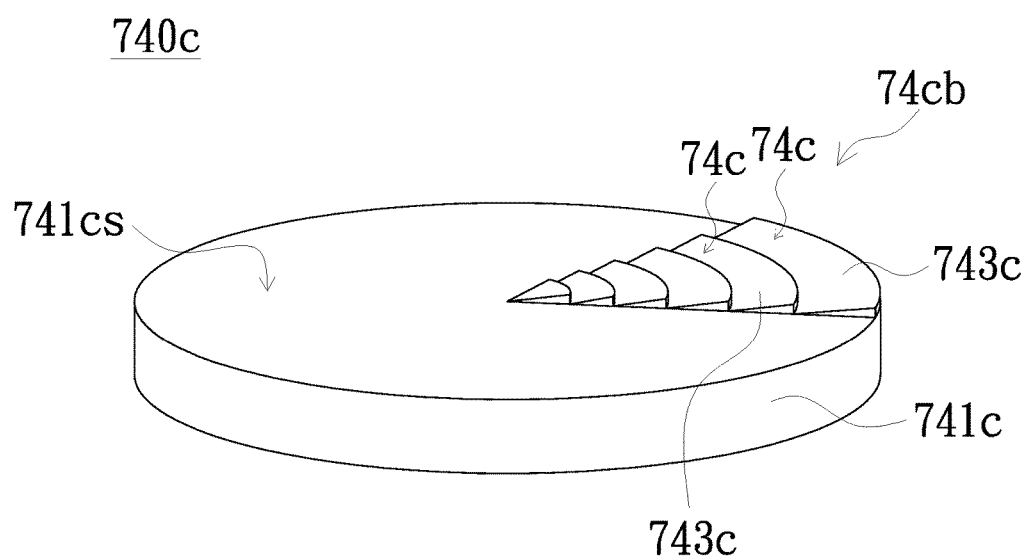

FIGS. 7A to 7C are perspective views of a phosphor wheel in accordance with the other three embodiments of the invention. The phosphor wheels 740a, 740b and 740c shown in FIGS. 7A to 7C are similar to the phosphor wheels 240, 540 and 640 in the aforementioned embodiments, and the overall functions of the phosphor wheels 740a, 740b and 740c are the same. However, unlike the aforementioned phosphor wheels 240, 540 and 640, the phosphor wheels 740a, 740b and 740c have bevels 74a, 74b and 74c, respectively. The bevels 74a, 74b and 74c may be used to reflect and deflect the excitation beam L10 to assist the excitation beam L10 emitted from the phosphor wheel (e.g., the phosphor wheel 240) from being blocked by the dichroic layer 221 (see FIG. 2A).

Referring to FIG. 7A. The phosphor wheel 740a includes a turntable 741a. The turntable 741a has a light receiving surface 741as and an inclined portion 743a located on the light receiving surface 741as, wherein the inclined portion 743a is located in the reflective region 74ab. The inclined portion 743a has a bevel 74a inclined with respect to the light receiving surface 741as, wherein the angle A1 between the bevel 74a and the light receiving surface 741as may be ranged between 0 and 10 degrees. In addition, the height of the inclined portion 743a with respect to the light receiving surface 741as decreases from the center of the turntable 741a toward the direction away from the center.

Referring to FIG. 7B. The phosphor wheel 740b is similar to the phosphor wheel 740a and also includes a turntable 741b. The turntable 741b has a light receiving surface 741bs and an inclined portion 743b located on the light receiving surface 741bs, wherein the inclined portion 743b is located in the reflective region 74bb. The inclined portion 743b has a bevel 74b inclined with respect to the light receiving surface 741bs, wherein the angle (not labeled) between the bevel 74b and the light receiving surface 741bs may be equal to the angle A1 in FIG. 7A. In addition, unlike the phosphor wheel 740a, the height of the inclined portion 743b with respect to the light receiving surface 741bs increases from the center of the turntable 741b toward the direction away from the center, as shown in FIG. 7B.

Referring to FIG. 7C. The phosphor wheel 740c is similar to the phosphor wheels 740a and 740b of the aforementioned embodiments and has a light receiving surface 741cs and a reflective region 74cb. However, unlike the phosphor wheels 740a and 740b, the turntable 741c of the phosphor wheel 740c has a plurality of inclined portions 743c located on the light receiving surface 741cs. Each of the inclined portions 743c is located in the reflective region 74cb and has a bevel 74c. Each of the bevels 74c is inclined with respect to the light receiving surface 741cs and the angle (not labeled) between each of the bevels 74c and the light receiving surfaces 741cs may be equal to the angle A1. As shown in FIG. 7C, it is apparent that these inclined portions 743c are arranged in a straight line along the radius of the turntable 741c, and the height of each of the inclined portions 743c with respect to the light receiving surface 741cs increases from the center of the turntable 741c toward the direction away from the center. However, in other embodiments, the height of each of the inclined portions 743c with respect to the light receiving surface 741cs may decrease from the center of the turntable 741c toward the direction away from the center.

Figure 8:
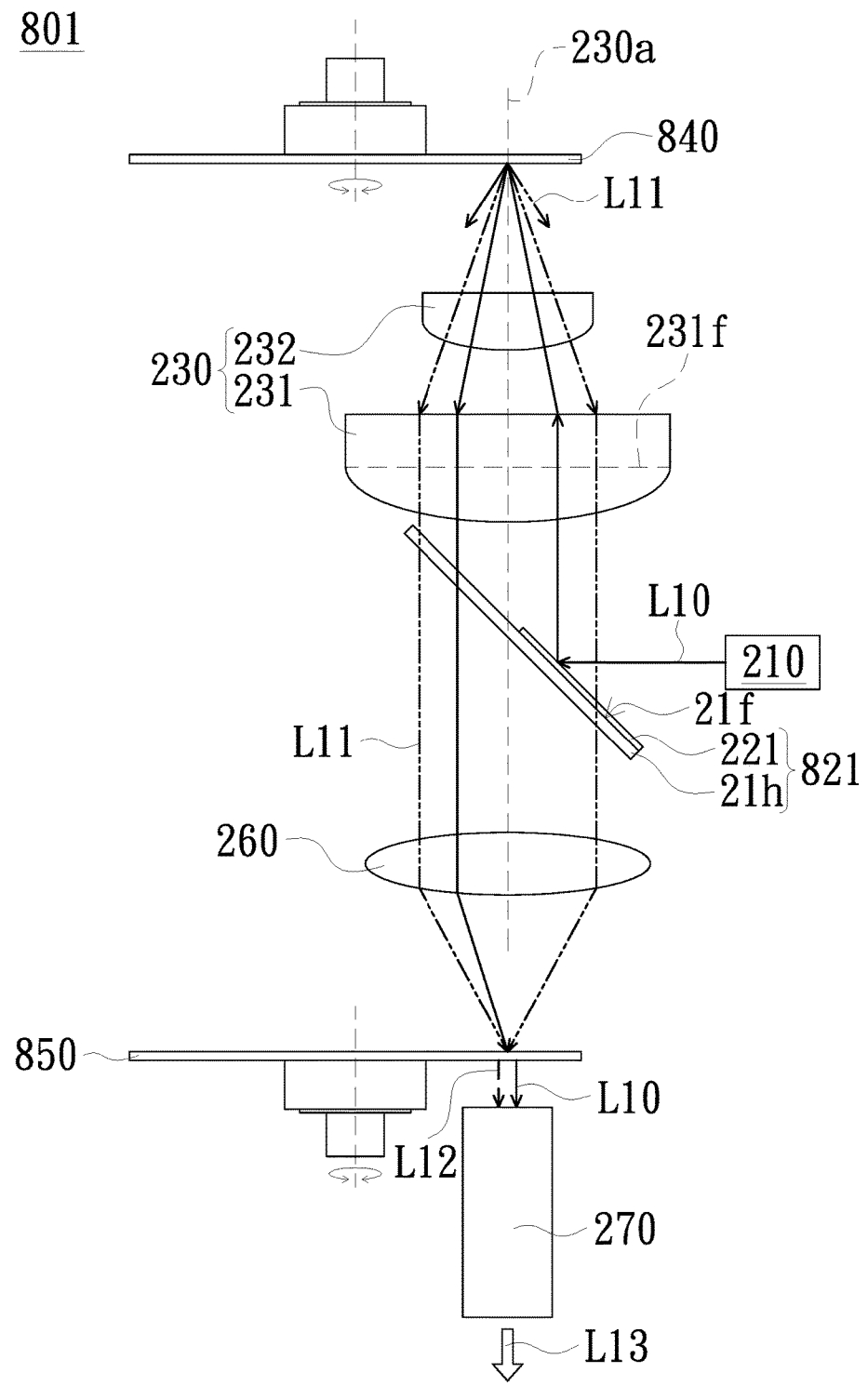
FIG. 8 is a schematic view of an illumination system in accordance with another embodiment of the invention.

FIG. 8 is a schematic view of an illumination system in accordance with another embodiment of the invention. Referring to FIG. 8. The illumination system 801 is similar to the illumination system 200 of the embodiment of FIG. 2A. The illumination systems 801 and 200 have the same effect and include the same elements, such as an excitation light source 210, a lens group 230, a phosphor wheel 840 and a filter wheel 850. The phosphor wheel 840 may be the phosphor wheel 240, 340, 540, 640, 740b or 740c of the aforementioned embodiment and the filter wheel 850 may be the filter wheel 250 or 450 of the aforementioned embodiment. The same features of the illumination systems 801 and 200 will not be described herein, and only the main difference between the illumination systems 801 and 200, that is, the dichroic device 821, will be described below.

Specifically, compared with the dichroic device 220 of FIG. 2A, the dichroic device 821 also includes a dichroic layer 221 and a transparent substrate 21h and the dichroic layer 221 is also formed on the plane 21f of the transparent substrate 21h; however, unlike the dichroic device 220, the dichroic layer 221 partially covers the plane 21f and exposes a portion of the plane 21f in the dichroic device 821. That is, the dichroic layer 221 does not completely cover the plane 21*f*. In addition, in FIG. 8, the optical axis 230*a* passes through the dichroic device 821 but does not pass through the dichroic layer 221. Further, the overlapping region projected by the dichroic layer 221 on the light flux cross-section 231*f* in the direction parallel to the optical axis 230*a* may be the same as the overlapping region Z2*b* or Z2*c* shown in FIGS. 2B and 2C. That is, the overlapping region projected by the dichroic layer 221 on the light flux cross-section 231*f* in FIG. 8 is also larger than the ¼ area of the light flux cross-section 231*f* and smaller than the ½ area of the light flux cross-section 231*f*.

Figure 9:
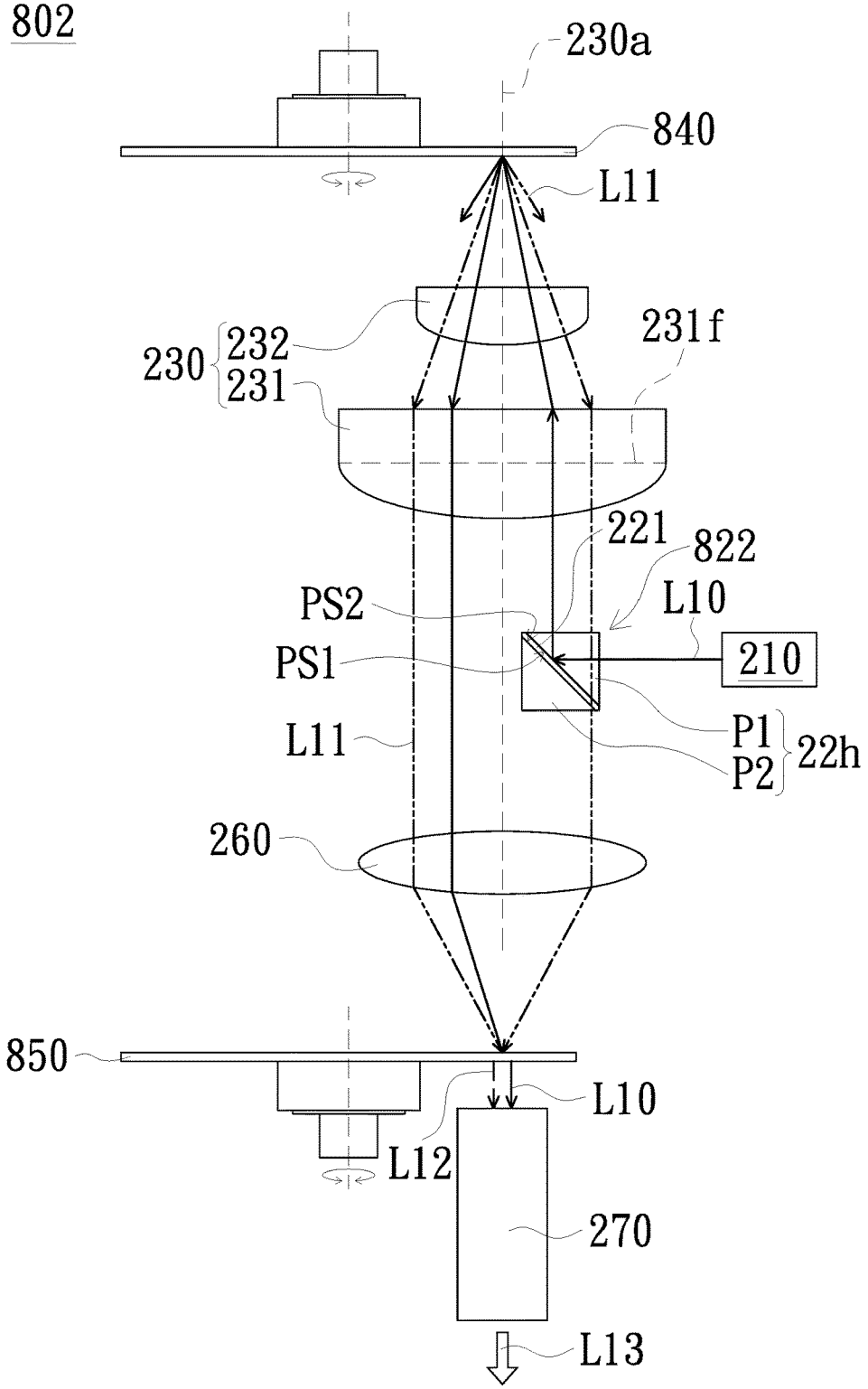
FIG. 9 is a schematic view of an illumination system in accordance with another embodiment of the invention.

FIG. 9 is a schematic view of an illumination system in accordance with another embodiment of the invention. Referring to FIG. 9. The illumination system 802 is similar to the illumination system 801 of the embodiment of FIG. 8 and the illumination systems 802 and 801 include the same elements. The main difference between the illumination systems 802 and 801 is that the dichroic device 822 including the prism group 22*h*. Specifically, the prism group 22*h* is a symmetrical prism group and includes a pair of prisms P1 and P2, as shown in FIG. 9. The prisms P1 and P2 have prism surfaces PS1 and PS2, respectively. These prisms PS1 and PS2 face each other to form an interface surface (not labeled) between these prism surfaces PS1 and PS2. The dichroic layer 221 may be formed on one of the prism surfaces PS1 and PS2, that is, the dichroic layer 221 is formed on the interface surface. In addition, the dichroic layer 221 may cover these prism surfaces PS1 and PS2.

Figure 10:
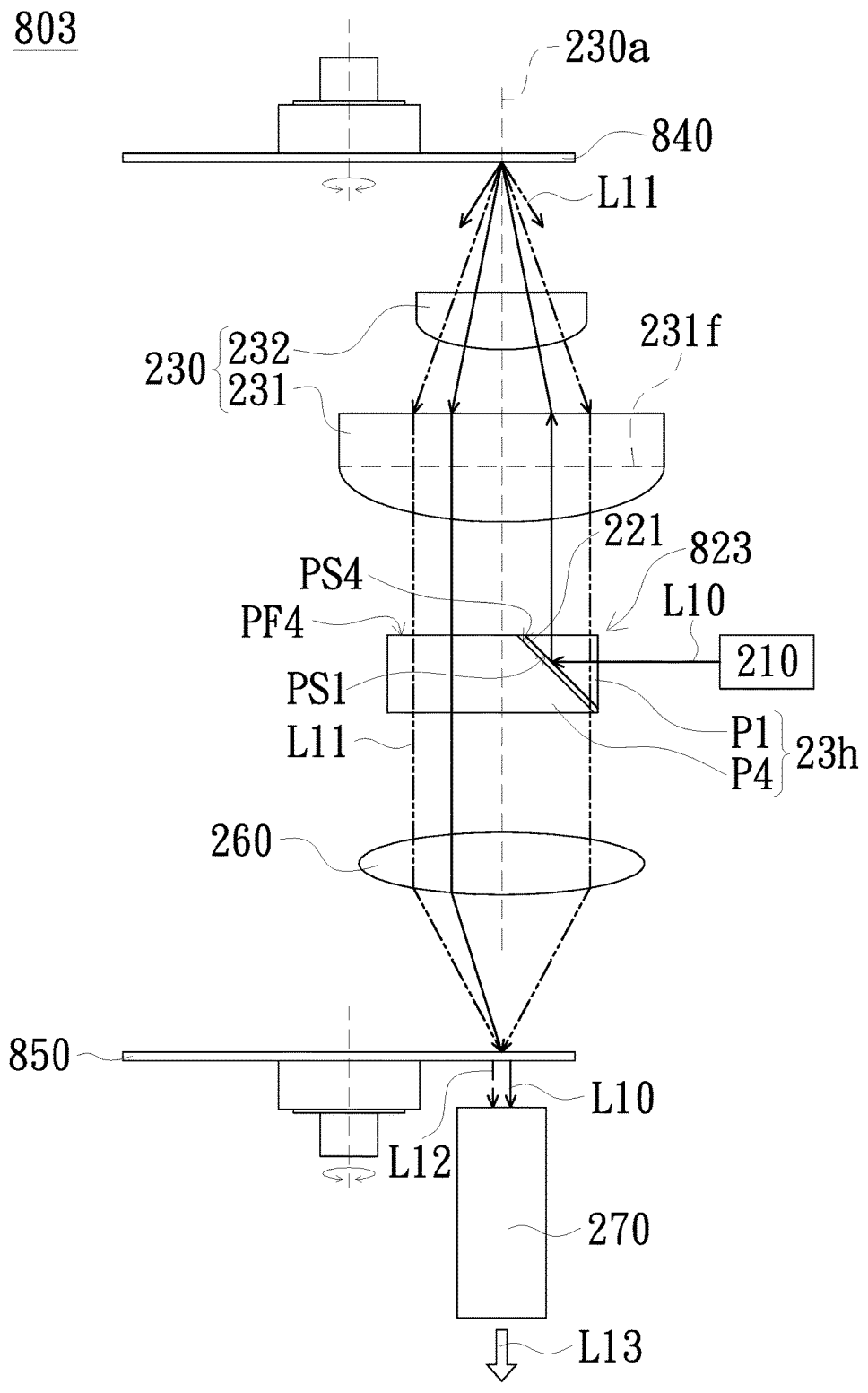
FIG. 10 is a schematic view of an illumination system in accordance with another embodiment of the invention.

FIG. 10 is a schematic view of an illumination system in accordance with another embodiment of the invention. Referring to FIG. 10. The illumination system 803 is similar to the illumination system 802 of the embodiment of FIG. 9, and the illumination systems 803 and 802 include the same elements. The main difference between the illumination systems 803 and 802 is that the asymmetric prism group 23*h* included in the dichroic device 823 of the illumination system 803, as shown in FIG. 10.

Specifically, the prism group 23*h* of the dichroic device 823 includes prisms P1 and P4, wherein the volume of the prism P4 is significantly larger than the volume of the prism P1, as shown in FIG. 10. The prism P4 has a prism surface PS4 and a light penetrating surface PF4, and the light penetrating surface PF4 is adjacent to the prism surface PS4. The excitation beam L10, the conversion beam L11 and the optical axis 230*a* penetrate the prism P4 from the light penetrating surface PF4, but the optical axis 230*a* does not penetrate the dichroic layer 221 of the dichroic device 823. In the embodiment of FIG. 10, the optical axis 230*a* may be perpendicular to the light penetrating surface PF4 to reduce the deflection of the light penetrating surface PF4 to the excitation beam L10 and the conversion beam L11, thereby assisting most or all of the excitation beam L10 and the conversion beam L11 to enter the light integration rod 270.

Figure 11:
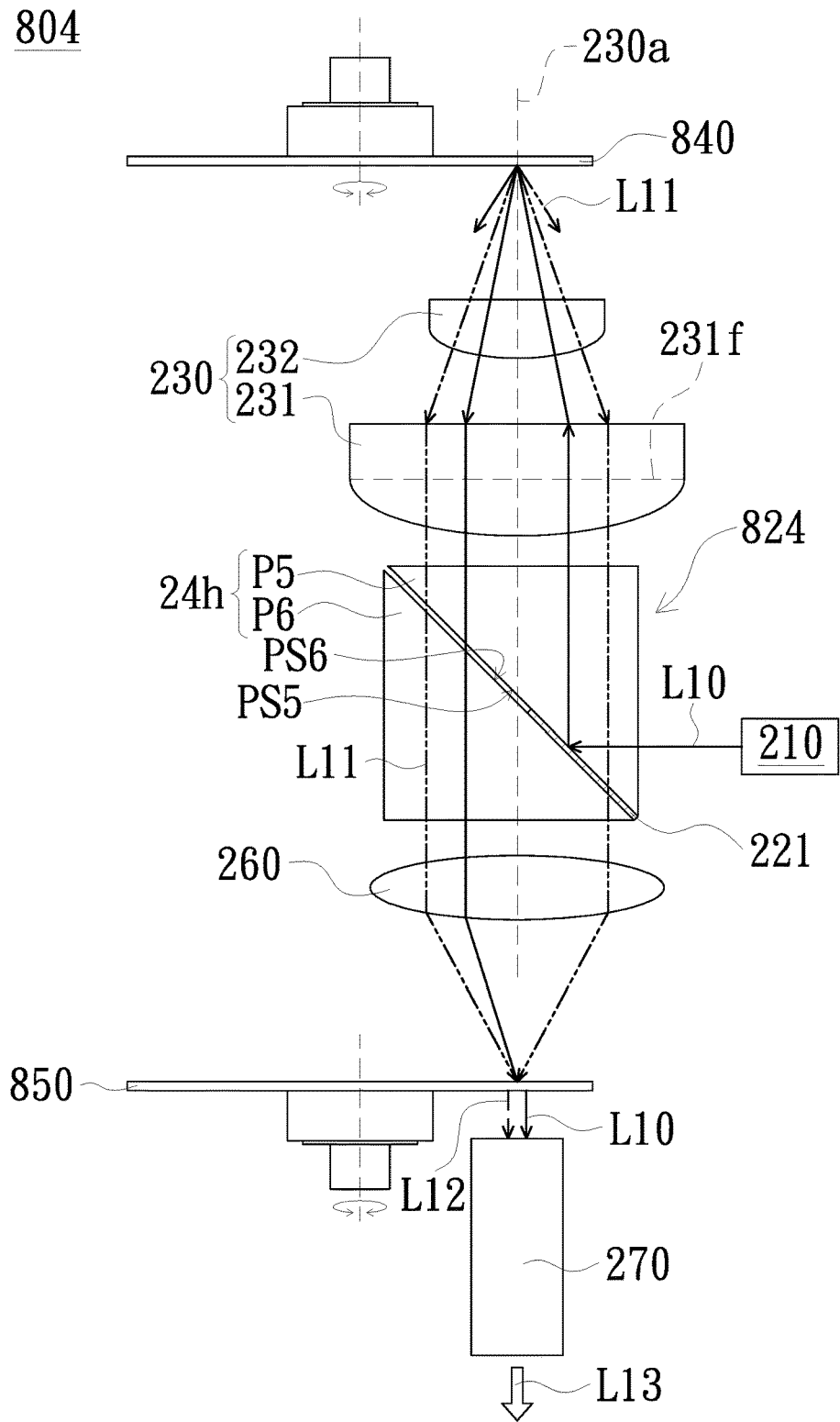
FIG. 11 is a schematic view of an illumination system in accordance with another embodiment of the invention.

FIG. 11 is a schematic view of an illumination system in accordance with another embodiment of the invention. Referring to FIG. 11. The illumination system 804 is similar to the illumination system 802 of the embodiment of FIG. 9, and only the difference between the illumination systems 804 and 802, i.e., the dichroic device 824 of the illumination system 804, will be described below. Same as the dichroic device 822 of FIG. 9, the dichroic device 824 also includes a symmetrical prism group 24*h*. The prism group 24*h* includes a pair of prisms P5 and P6. The prisms P5 and P6 have prism surfaces PS5 and PS6, respectively, and these prism surfaces PS5 and PS6 face each other. However, unlike the dichroic device 822, the volume of the prism group 24*h* is significantly larger than the volume of the prism group 22*h* of FIG. 9, and the dichroic layer 221 partially covers the prism surfaces PS5 and PS6 in the dichroic device 824, that is, the dichroic layer 221 does not cover a portion of each of the prism surfaces PS5 and PS6, and the optical axis 230*a* does not pass through the dichroic layer 221.

Figure 12:
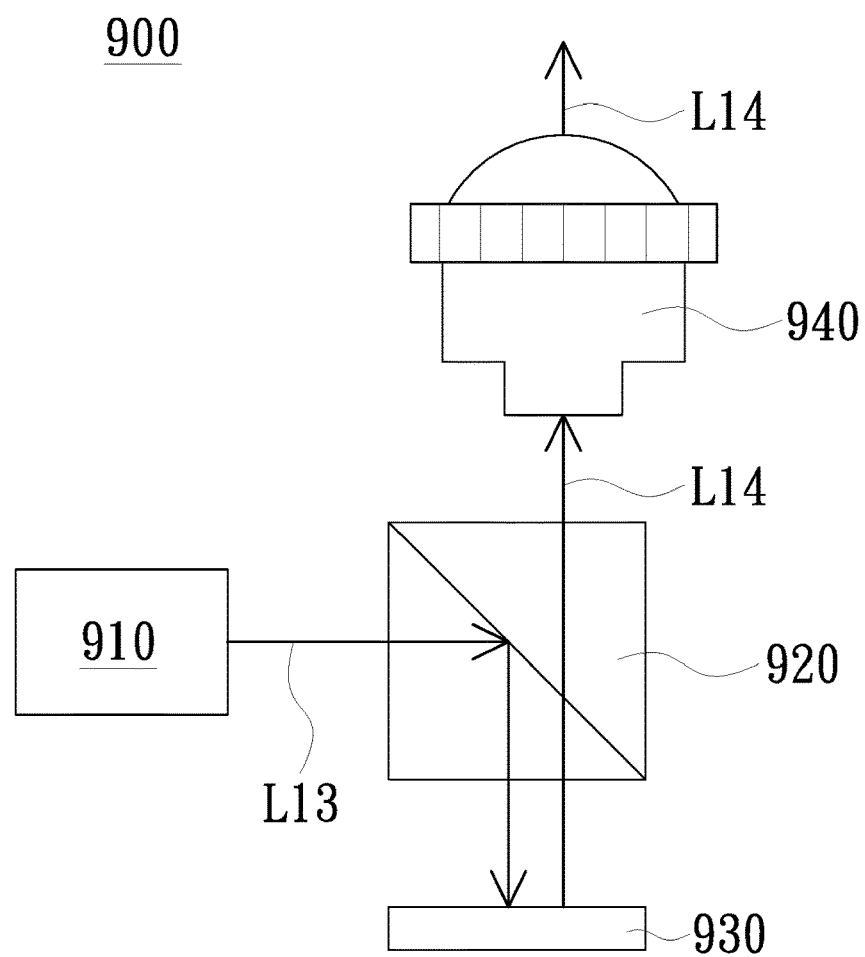
FIG. 12 is a schematic view of a projector in accordance with an embodiment of the invention.

The illumination systems described in the aforementioned embodiments all can be used for a projector. Referring to FIG. 12, which is a schematic view of a projector 900 in accordance with an embodiment of the invention. The projector 900 includes an illumination system 910, a light valve unit 930 and a projection lens 940, wherein the illumination system 910 is the illumination system 200, 801, 802, 803 or 804 of the aforementioned embodiments and can generate the illumination beam L13. The light valve unit 930 is disposed on the transmission path of the illumination beam L13 and can convert the illumination beam L13 into the image beam L14. The projection lens 940 is disposed on the transmission path of the image beam L14 and can project the image beam L14 on the screen to form an image screen. In addition, the light valve unit 930 may include a reflective liquid crystal on silicon (LCOS) or a digital micro-mirror device (DMD), a transmissive spatial light modulator such as a transparent liquid crystal panel, etc. In addition, depending on the input control signal, the light modulator 120 is, for example, an optical addressable spatial light modulator (OASLM) or an electrically addressed spatial light modulator (EASLM), and the invention does not limit the type of the light modulator 120.

In summary, by the disposing means between the aforementioned dichroic layer and the lens group, the overlapping area projected by the dichroic layer on the light flux cross-section is not passed through by the optical axis of the lens group and the area of the overlapping region is larger than the ¼ area of the light flux cross-section and smaller than the ½ area of the light flux cross-section. Thus, the optical axis of the lens group does not pass through the dichroic layer and the axis of the excitation beam is noncoaxial with the optical axis of the lens group, so that the lens group can deflect the excitation beam and the excitation beam emitted from the phosphor wheel is not all blocked by the dichroic layer, or even completely not blocked by the dichroic layer. Compared with the conventional illumination systems, the invention apparently employs fewer optical elements and has a simpler optical layout, thereby helping to reduce cost and volume.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system, comprising:
   an excitation light source, for emitting an excitation beam;
   a lens group, having an optical axis and a light flux cross-section perpendicular to the optical axis;
   a dichroic device, comprising a dichroic layer, wherein the dichroic layer is adapted for reflecting the excitation beam to the lens group and projecting an overlapping region on the light flux cross-section in a direction parallel to the optical axis, wherein the optical axis does not pass through the overlapping region, and an area of the overlapping region is larger than a ¼ area of the light flux cross-section and smaller than a ½ area of the light flux cross-section; and
   a phosphor wheel, adapted for receiving the excitation beam passing through the lens group and having a reflective region and at least one phosphor region, wherein the at least one phosphor region is adapted for converting the excitation beam into a conversion beam and reflecting the conversion beam to the lens group, and the reflective region is adapted for reflecting the excitation beam back to the lens group, wherein the excitation beam and the conversion beam both pass through the light flux cross-section, and the conversion beam penetrates the dichroic layer.

2. The illumination system according to claim 1, wherein the phosphor wheel comprises:
   a turntable, having a light receiving surface, wherein the light receiving surface is divided into the reflective region and the at least one phosphor region; and
   at least one phosphor material, disposed in the at least one phosphor region and is adapted for converting the excitation beam into the conversion beam.

3. The illumination system according to claim 2, wherein the turntable further has:
   an optical microstructure, formed on the light receiving surface and located in the reflective region, wherein the optical microstructure is adapted for scattering the excitation beam.

4. The illumination system according to claim 3, wherein the optical microstructure comprises a plurality of protrusions or a plurality of recesses formed on the light receiving surface.

5. The illumination system according to claim 2, wherein the phosphor wheel further comprises:
   a light diffusion film, formed on the light receiving surface and located in the reflective region.

6. The illumination system according to claim 2, wherein the turntable further has an inclined portion located on the light receiving surface, and the inclined portion is located in the reflective region and has a bevel inclined with respect to the light receiving surface.

7. The illumination system according to claim 6, wherein a height of the inclined portion with respect to the light receiving surface decreases from a center of the turntable toward a direction away from the center.

8. The illumination system according to claim 6, wherein a height of the inclined portion with respect to the light receiving surface increases from a center of the turntable toward a direction away from the center.

9. The illumination system according to claim 2, wherein the turntable further has a plurality of inclined portions located on the light receiving surface, and each of the inclined portions is located in the reflective region and has a bevel, wherein each of the bevels is inclined with respect to the light receiving surface, and each of the inclined portions is arranged in a straight line along a radius of the turntable.

10. The illumination system according to claim 9, wherein a height of each of the inclined portions with respect to the light receiving surface decreases from a center of the turntable toward a direction away from the center.

11. The illumination system according to claim 9, wherein a height of each of the inclined portions with respect to the light receiving surface increases from a center of the turntable toward a direction away from the center.

12. The illumination system according to claim 1, wherein the phosphor wheel comprises:
   an auxiliary phosphor material, disposed in the reflective region and for converting a portion of the excitation beam into an auxiliary color light.

13. The illumination system according to claim 12, wherein the auxiliary phosphor material partially covers the reflective region.

14. The illumination system according to claim 12, wherein the auxiliary phosphor material completely covers the reflective region.

15. The illumination system according to claim 1, wherein the dichroic device further comprises:
   a transparent substrate, wherein the transparent substrate has a plane, and the dichroic layer is formed on the plane.

16. The illumination system according to claim 15, wherein the dichroic layer exposes a portion of the plane.

17. The illumination system according to claim 15, wherein the transparent substrate has a beveled edge and the beveled edge is parallel to the optical axis.

18. The illumination system according to claim 1, wherein the dichroic device further comprises:
   a prism group, comprising a pair of prisms, wherein each of the prisms has a prism surface, the prism surfaces of the prisms face each other to form an interface surface between the prism surfaces, and the dichroic layer is formed on the interface surface and covers the prism surfaces.

19. The illumination system according to claim 18, wherein the dichroic layer does not cover a portion of each of the prism surfaces.

20. The illumination system according to claim 18, wherein one of the pair of prisms has a light penetrating surface adjacent to the prism surface, and the excitation beam, the conversion beam and the optical axis penetrates the prism from the light penetrating surface.

21. The illumination system according to claim 1, further comprising:
a light receiving member, for converging the excitation beam and the conversion beam, wherein the dichroic device is disposed between the light receiving member and the lens group.

22. The illumination system according to claim 1, further comprising:
a filter wheel, for filtering the conversion beam to form a plurality of filter beams, wherein the lens group is disposed between the filter wheel and the phosphor wheel.

23. The illumination system according to claim 22, wherein the filter wheel has a light penetrating portion allowing the excitation beam to penetrate, and the light penetrating portion has a surface scattering structure or a plurality of light scattering particles.

24. The illumination system according to claim 22, further comprising:
a light integration rod, disposed on a transmission path of the filter beams and the excitation beam and for converting the filter beams and the excitation beam into an illumination beam.

25. A projector, comprising:
an illumination system, comprising:
an excitation light source, adapted for emitting an excitation beam;
a lens group, having an optical axis and a light flux cross-section perpendicular to the optical axis;
a dichroic device, comprising a dichroic layer, wherein the dichroic layer is adapted for reflecting the excitation beam to the lens group and projecting an overlapping region on the light flux cross-section in a direction parallel to the optical axis, wherein the optical axis does not pass through the overlapping region, and an area of the overlapping region is larger than a ¼ area of the light flux cross-section and smaller than a ½ area of the light flux cross-section;
a phosphor wheel, adapted for receiving the excitation beam passing through the lens group and having a reflective region and at least one phosphor region, wherein the at least one phosphor region is for converting the excitation beam into a conversion beam and reflecting the conversion beam to the lens group, and the reflective region is adapted for reflecting the excitation beam back to the lens group, wherein the excitation beam and the conversion beam both pass through the light flux cross-section, and the conversion beam penetrates the dichroic layer;
a filter wheel, disposed on a transmission path of the conversion beam and the excitation beam and adapted for filtering the conversion beam to form a plurality of filter beams; and
a light integration rod, disposed on a transmission path of the filter beams and the excitation beam and adapted for converting the filter beams and the excitation beam into an illumination beam,
a light valve unit, disposed on a transmission path of the illumination beam and adapted for converting the illumination beam into an image beam; and
a projection lens, disposed on a transmission path of the image beam.

26. The projector according to claim 25, wherein the illumination system further comprises:
a light receiving member, adapted for converging the excitation beam and the conversion beam, wherein the dichroic device is disposed between the light receiving member and the lens group.

27. The projector according to claim 25, wherein the light valve unit comprises a reflective liquid crystal panel, a transmissive liquid crystal panel or a digital micro-mirror device.

* * * * *